United States Patent [19]

Igarashi

[11] 4,274,723
[45] Jun. 23, 1981

[54] AUTO ELECTRONIC FLASH UNIT

[75] Inventor: Sigemi Igarashi, Tokyo, Japan

[73] Assignee: Sato Koki Company, Ltd., Tokyo, Japan

[21] Appl. No.: 2,593

[22] Filed: Jan. 11, 1979

[30] Foreign Application Priority Data

Apr. 30, 1978 [JP] Japan .................................. 53-51506

[51] Int. Cl.³ ............................................ G03B 15/05
[52] U.S. Cl. .................................... 354/33; 354/60 L
[58] Field of Search .................... 354/32, 33, 35, 127, 354/128, 60 L

[56] References Cited

U.S. PATENT DOCUMENTS 4,122,465  10/1978  Hasagawa et al. .................. 354/128

Primary Examiner—L. T. Hix
Assistant Examiner—W. J. Brady
Attorney, Agent, or Firm—Donald D. Mon

[57] ABSTRACT

In conventional flash units it is impossible to photograph at a distance which is out of the range of the auto control distance indicator even though proper exposure may be possible due to the latitude of film and error margin in the guide numbers. With the present invention it is possible to photograph either in or beyond the range of the distance auto control with proper exposure.

4 Claims, 10 Drawing Figures

AUTO ELECTRONIC FLASH UNIT

BACKGROUND OF THE INVENTION

The present invention relates to auto electronic flash units.

In the past with conventional auto-flash units there is a critical distance point between the flash unit (i.e. camera) and the object being photographed at which auto control is possible but beyond this distance (i.e. the critical point) proper exposure could not be obtained because of insufficient exposure. Therefore it is important and necessary to inform the camera operator whether or not the proper exposure for the film is possible. Conventional auto-flash units operate by a photo-sensing device which receives reflected light from the subject, detects an electric signal which is produced when the reflected light reaches a pre-determined level and then interrupts the illumination of the flash unit. Accordingly with these conventional auto-flash units the camera operator is only informed when the interruption of the illumination occurs. However, there is some distance beyond the maximum distance of the auto control at which proper exposure is possible due to the latitude of the film and error inherent in guide numbers. Because of these features the range of conventional auto-flash units for photography is narrow.

SUMMARY OF THE INVENTION

Therefore the main purpose of the present invention is to overcome this defect and the disadvantages of conventional auto flash units.

One object of the present invention is to provide an auto-electronic flash unit for photography in which proper exposure is possible either in the range of the auto control distance or beyond the range of the auto control distance due to the latitude of film and error margin of guide numbers so that camera range may be extended.

The details of the construction of the invention will be better understood by reference to the following detailed description when considered in conjunction with the accompanying drawings. Although a preferred embodiment of the invention is illustrated and described herein many modifications and variations become apparent without departing from the spirit of the invention scope as set forth in the appended claims.

DETAILED DESCRIPTION OF THE PREFERRED EMBODIMENT

Figure 1:
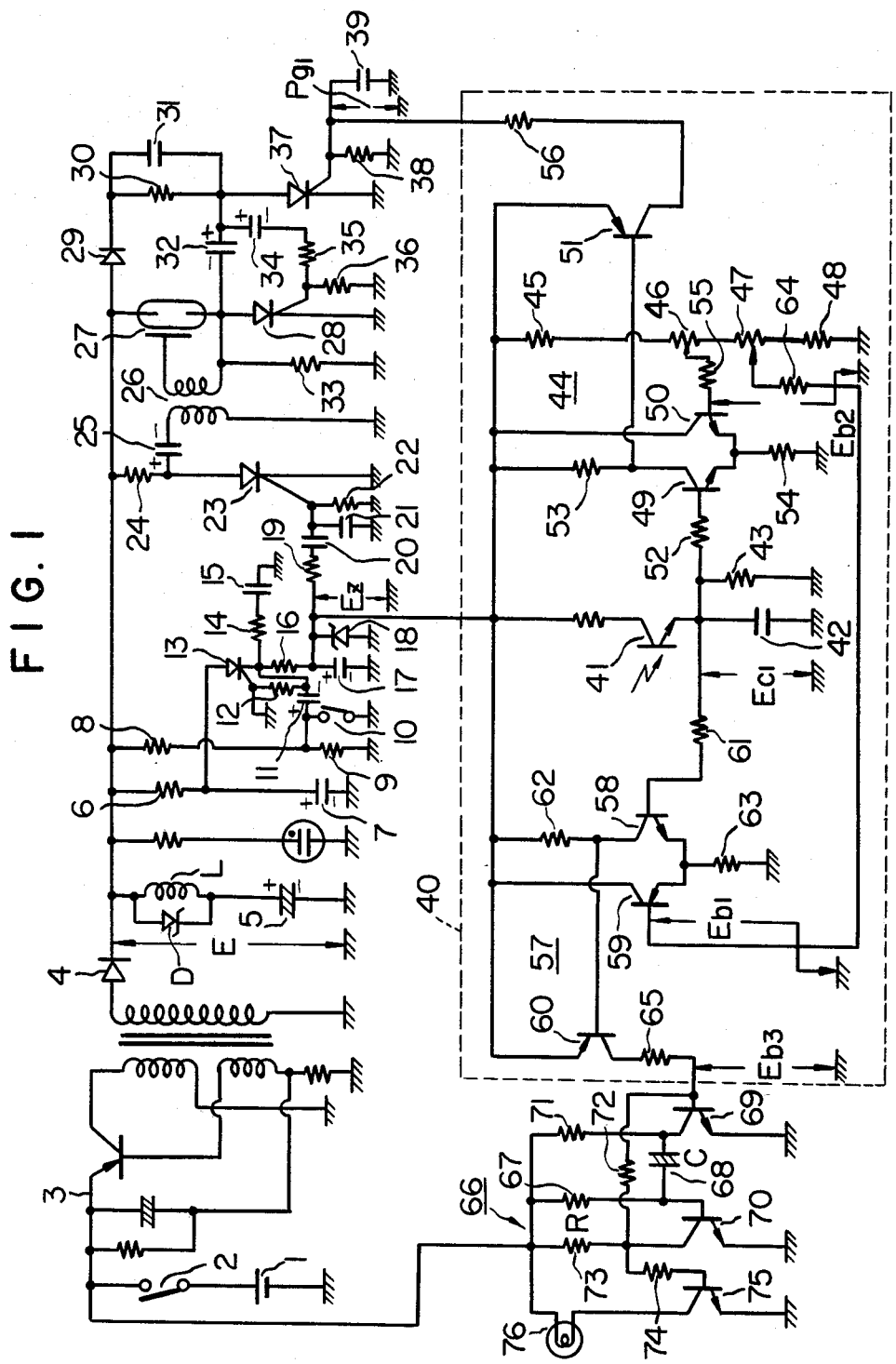
FIG. 1 is a schematic diagram of a preferred embodiment of the present invention.

The present invention is directed to auto electronic flash unit illustrated schematically in FIG. 1. A DC source such as a battery is shown at 1 providing electric power through suitable power switch 2 to a converter circuit 3 for transforming DC current into AC current for distribution to a transformer. The output of the transformer is rectified by diode 4 from AC to a DC voltage E. Capacitor 5 is the main capacitor for charging the flash lamp and is charged with the DC voltage E through the parallel circuit of diode D and inductance coil L (herein after call D-L circuit). Capacitor 7 is also charged with DC voltage E through resistor 6. A voltage divider comprised of resistors 8 and 9 divides the DC voltage E and applies it to a synchronous contact 10 connected for operation simultaneously with the shutter button of a camera and in parallel with resistance 9 of the voltage divider. Capacitor 11 is charged through resistors 8 and 12 which turns on thyristor 13 by the voltage generated in the resistor 12 due to the discharge current from condensor 11 upon closing of the synchronous contact of switch 10.

Capacitor 15 is charged through resistor 14 of the low resistance when the thyristor 13 turns on and during the moment when the capacitor 7 discharges through the resistor 14. The electric charge in capacitor 15 charges condenser 17 through resistor 16. The voltage of capacitor 17 is maintained at a constant level by zener diode 18 during a pre-determined period.

Thyristor 23 which is turned on by the output voltage of the constant voltage regulated power supply of zener diode 18 provides an output voltage which is added to the gate of thyristor 23 through the series circuit of resistor 19 and capacitor 20. The DC voltage E from rectifier 4 also charges condenser 25 through resistor 24 and the primary of trigger transformer 26. Zenon flash tube 27 is triggered by the trigger power generator at the secondary side of transformer 26 when thyristor 23 turns on discharge capacitor 25 through the primary side of the transformer 26. Capacitor 32 is charged by DC voltage E through diode 29, resistor 33 and parallel circuit of resistor 30 and capacitor 31. The capacitor 34 and resistor 35 are connected in series between the positive side of capacitor 32 and the gate of thyristor 28 connected in series with the flash tube 27. Thyristor 37 turns thyristor 28 off by reverse electric charge from the output of the capacitor 32. Thus, thyristor 28 and 37 in conjunction with capacitor 32 comprises an interruption circuit for cutting off light emissions from the flash tube 27. The gate of the thyristor 37 is connected to the cathode through the parallel circuit of resistor 38 and capacitor 39.

Light emitted from flash tube 27 is reflected from the subject being photographed and received by photo-sensing circuit device 40 driven by output voltage $E_z$ from constant voltage regulated power supply including Zener-diode 18. A photo-sensing element 41 such as a photo transistor receives the reflected light from the subject causing capacitor 42 to store electric charges to a value of $E_{c1}$ according to the amount of received light. In parallel with the capacitor 42 is a resistor 43.

An integral circuit indicated at 44 in photo-sensing circuit device 41 is provided for interrupting the illumination for light emitted from the flash tube 27 when the charging voltage $E_{c1}$ reaches a pre-determined voltage. The value of voltage $E_{c1}$ is predetermined by comparison to the pre-determined voltage $E_{b2}$ which is set by adjusting variable resistor or potentiometer 46 connected in series with resistors 45, 47 and 48. When the charging voltage $E_{c1}$ reaches the level of the pre-set voltage $E_{b2}$ the integral circuit indicated at 44 applies a gate pulse $P_{g1}$ to the gate of thyristor 37 to interrupt the operation and thus the emission of light from flash tube 27.

The integral circuit 44 is comprised of transistor 49, 50 and 51 and resistors 52, 54 and 56. The voltage comparison circuit is provided by transistors 49 and 50. The output resistor 53 of comparison circuit of transistors 49 and 50 is connected from base to emitter of switching transistor 51. When the charging voltage $E_{c2}$ of capacitor 42 reaches the pre-determined set value of voltage $E_{b1}$ set by potentiometer 46 the output of the comparison circuit at the resistor 53 turns transistor 51 on. At this time electric current flow from constant voltage $E_z$ through transistor 51, resistor 56 and 38 and capacitor 39 to produce a gate pulse $P_{g1}$ between the gate and cathode of thyristor 37.

In the present invention an additional or secondary integral circuit indicated at 57 is provided in the photo-sensing circuit device 40. A voltage $E_{b1}$ is set in the secondary integral circuit 57 is set lower than the pre-determined voltage $E_{b2}$ and drives an alarm circuit 66 indicating the correct exposure of film when said charge voltage $E_{c1}$ reaches the pre-determined voltage $E_{b2}$.

The secondary integral circuit indicated at 57 is nearly indentical with the integral circuit 44 and is comprised of transistors 58, 59 and 60, resistors 61–65 and variable resistor or potentiometer 47 for adjusting and setting the voltage $E_{b1}$. It is not necessary that the circuit for setting the voltages $E_{b1}$ and $E_{b2}$ be common for both of the integral circuits 44 and 57 as a separate voltage setting circuit may be provided for the integral circuit 57 if desired. The integral circuit 44 and 57 for providing comparing and switching functions are not necessarily limited to the particular circuit illustrated in FIG. 1.

The alarm circuit 66 is comprised of a one shot multi-vibrator which produces an output during a pre-determined period T determined by the time constant RC of resistor 67 and capacitor 68 from the output voltage $E_{b3}$ of the second integral circuit 57. Included in alarm circuit 66 is the lamp circuit triggered by the one shot multi-vibrator circuit comprised of transistors 69 and 70, resistors 67 and 71–73, and capacitor 68. The circuit for energizing lamp 76 is comprised of switching transistor 75 which is turned on by the output of the shot multi-vibrator circuit through resistor 74 and lamp 76. Other alarm circuit operated by the output voltage $E_{b3}$ may be used and the circuit should not be limited to the circuit illustrated in FIG. 1. For example a speaker buzzer may be used for the alarm instead of a lamp 76.

The operation of the auto electronic flash unit will now be described in conjunction with the drawings of FIGS. 2 and 3.

When photographing with the flash unit the power switch 2 will be closed and the AC output of converter indicated at 3 will be rectified into DC voltage E by diode 4. This DC voltage E charges main capacitor 5 to the polarity shown in FIG. 1 through the D-L circuit. Capacitor 7, 11, 24, 25 and 32 are also charged to the value of E, DC volts at the polarity shown in FIG. 1 through resistor 6, resistor 8 and 12, resistor 24 and primary side of transformer 26, diode 29 in parallel with the circuit of resistor 30 and capacitor 31, respectively.

When synchronized contact of switch 10 is closed simultaniously with pressing the shutter button on a camera the charge in capacitor 11 will be discharged through the synchro-contact of switch 10 and resistor 12 producing a voltage at resistor 12 which turns thyristor 13 on. The charge in capacitor 7 discharges through thyristor 13 and resistor 14 charging capacitor 15 for the moment. The charge in the capacitor 15 is supplied to constant regulated power supply including zener-diode 18 producing constant voltage $E_z$ which is the electric source for photo-sensing circuit device 40 and when applied to the gate and cathode of thyristor 23 turns thyristor 23 on. When thyristor 23 turns on the charge in capacitor 25 discharges through the thyristor 23 and primary coil of transformer 26 produces a trigger pulse at the secondary coil to trigger the flash tube 27. At this moment the anode of flash tube is at plus E volt from capacitor 5. Therefore, the voltage from anode to cathode is E volts and said trigger pulse together with said voltage E energize the flash tube 27. As a result the charge in capacitor 5 flows through the D-L circuit, flash tube 27, capacitor 32 and 34 and resistors 35 and 36, with the voltage generated at resistor 36 turning the thyristor 28 on. Thus flash tube 27 emits light caused by current discharging and flowing through the flash tube 27 and thyristor 28.

Figure 2:
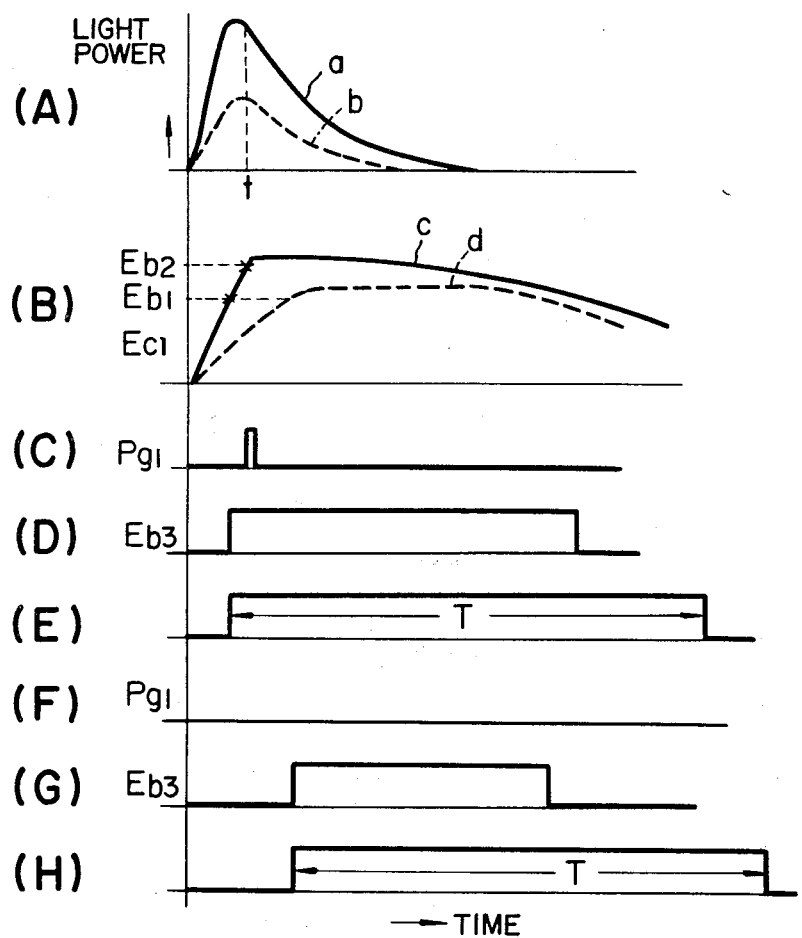
FIG. 2 A–H are graphs illustrating electric waves at various portions of the electric circuit illustrated in FIG. 1.
Figure 3:
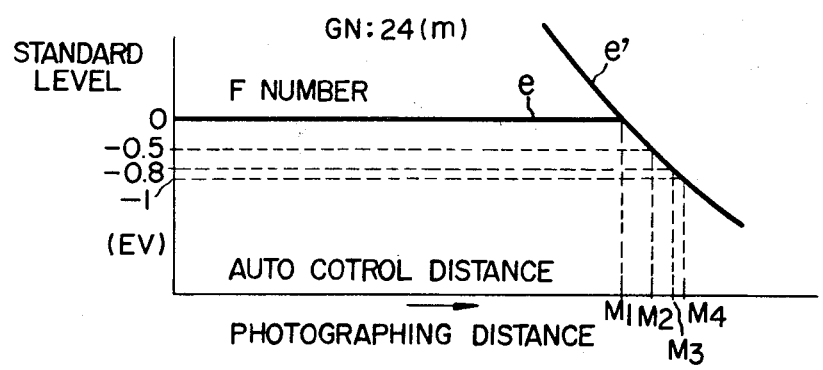
FIG. 3 is a graph having a characteristic curve illustrating the relationship of exposure light and photographing distance.

In FIG. 2 A the curve a illustrates the light intensity at the subject when the distance between the camera and subject is within the range of the auto-control distance. In FIG. 2 A the curve B illustrates the light intensity at the subject when the distance between the camera and the subject is beyond the range of the auto-control distance.

In a case when the distance between the camera and the subject being photographed is within the range of the auto control distance, the intensity of light reflected from the subject is strong and the photo-sensing element 41 receives sufficient light to charge capacitor 42 in a manner shown by charging curve c in FIG. 2 B. When the charging voltage $E_{c2}$ reaches the level of pre-set voltage $E_{b2}$ of secondary integral circuit 57 and output voltage $E_{b3}$ (shown in FIG. 2 D) is transmitted to the alarm circuit 66. The output voltage $E_{b3}$ remains until the charged voltage $E_{c1}$ falls according to the curve c in FIG. 2 B and reaches a value less than the predetermined voltage $E_{b1}$. The output voltage $E_{b3}$ operates the alarm circuit 66 and lamp 76 lights. FIG. 2 E illustrates the duration of alarm time of alarming circuit 66 and lighting time of the lamp 76. When lamp 76 lights it indicates that the photography is being performed with suitable or proper light exposure. When the charge voltage $E_{c2}$ of the capacitor 42 in photo-sensing device 40 reaches the pre-set voltage $E_{b2}$ (FIG. 2 B) a pulse $P_{g1}$ shown in FIG. 2 C is transmitted by integral circuit 44 to the gate of thyristor 37 turning it on. When thyristor 37 turns on the electric charge on capacitor 32 flows to the thyristor 28 in a reverse direction through thyristor 37 turning thyristor 28 off. Illumination from flash tube 27 is interrupted at time t of the curve a in FIG. 2 A ending the photography. When photographing within the range of the auto control distance, the reflected light is strong and proper exposure of the film is attained by interrupting the illumination from flash tube 27 according to the distance from the subject. Thus improper exposure does not occur, and lighting of the lamp 76 indicates the proper exposure.

When the distance between the camera and the subject is beyond the range of the auto control distance, the reflected light from the subject is weak as shown by the curve b in FIG. 2 A, and capacitor 42 is charged along the curve d of FIG. 2 B according to the received light. As before, when the charged voltage $E_{c1}$ reaches the pre-set voltage $E_{b1}$ of secondary integral circuit 57 as shown in FIG. 2 B, a voltage $E_{b3}$ shown in FIG. 2 G is transmitted from the integral circuit to the alarm circuit 66. The output voltage $E_{b3}$ of the integral circuit 57 remains until the charge voltage $E_{c1}$ of capacitor 42 falls along curve d of FIG. 2 B and reaches a value less than pre-set voltage $E_{b1}$. This voltage $E_{b3}$ operates the alarm circuit 66 and lamp 76 and continues the operation constant for a time T as shown in FIG. 2 H. When lamp 76 is lit it indicates flash photography under proper illumination.

When charged voltage $E_{c1}$ of capacitor 42 in photosensing device 40 does not reach the pre-set voltage $E_{b2}$ in the primary integral circuit 44 as shown in FIG. 2 B no pulse $P_{g1}$ is generated as shown in FIG. F thus, thyristor 37, for interrupting the illumination from flash tube 27, does not turn on. Therefore, interruption of flash tube 27 does not occur and illumination continues along curve b as shown in FIG. 2 A. The photograph obtained, as before, is properly exposed with the guide number and latitude of film exposure even though the distance between the camera and the subject is beyond the range of the auto control distance. At an even greater distance with light received at photo-sensing element 41 in photo-sensing device 40 even less, the charge voltage $E_{c1}$ of capacitor 42 does not reach pre-set voltage $E_{b1}$ of secondary integral circuit 57 and an output voltage $E_{b3}$ is not produced. Thus, alarm circuit 66 does not operate and lamp 76 does not light indicating improper exposure. This indicates a need to move closer to the subject being photographed. The operator can then approach the subject to a distance at which lamp 76 lights and can photograph the subject under proper exposure.

Accordingly the pre-set voltage $E_{b2}$ in the primary integral circuit 44 is set to the critical point of the range of the auto-control distance and the pre-set voltage $E_{b1}$ in the secondary integral circuit 57 is set to a critical point at which proper exposure is obtained at minimum levels. The point M1 in FIG. 3 is the critical point for the auto control distance. For example when the guide number is set at GN=24 m and the standard level (oev) is set at F number=4, the range of the auto control distance is 0–6 m. The distance from point M1 to M4 is beyond the range of the auto control distance however, it is possible to still obtain proper exposure. Point M4 is the critical point (8.5 m in this case). A curve e' in FIG. 3 shows the relationship between exposure value (EV) at the film plane and photographing distance beyond auto-control while curve e in FIG. 3 shows the same relation within auto-control. The exposure value at the film is constant in the range of the auto-control distance, however, IT DECREASES according to the curve e' at a range beyond the auto-control distance. The range between M1 and M4 is a range at which proper exposure may be obtained even if the exposure value is varied. The range of this exposure value is 0.14 lux sec. to 0.08 lux sec. and the difference is 0.806 (EV).

Heretofore, proper photography distances are indicated only when the photography is performed in the range of the auto-control distance so that the distance range is therefore narrow. With the present invention proper photography is indicated not only when the photography is being performed within the range of the auto-control distance but even when the photograph is performed beyond the range of the auto-control distance. Thus it is possible with the present invention to obtain proper exposure due to the latitude of film and margin of error in guide numbers so that the range at which it is possible to photograph is extended to a maximum critical point. It is possible to reduce the settinmg distance at which photography may be performed from a distance M4 to a distance M2=7.1 m or M3=7.9 m and the photographer is warned when photographing properly at distances of M2 or M3.

As explained above with the present invention it is possible to extend the distance for proper photography up to the maximum critical distance at which photographing is possible.

I claim:

1. An auto-electronic flash unit comprising: a photosensing means for receiving light from a subject; a flash tube for emitting flash light by discharging current from a main condenser for illumination of said subject; a primary integral circuit means; interruption circuit means for interrupting the illumination from said flash tube when the amount of light reflected from the subject and received by said photo-sensing means exceeds a predetermined setting in said primary integral circuit means by application of an electric signal from said primary integral circuit circuit means; a secondary integral means; said secondary integral circuit means adapted to generate an electric signal when the light reflected from the subject is less than the predetermined value set in said primary integral circuit means for energizing said interrupting means, but equal to or more than a predetermined setting in said secondary integral circuit means at which proper exposure can occur; adjusting means for adjusting the predetermined setting in said primary and secondary integral circuit means; indicating means receiving the electric signal generated by said secondary integral circuit means for indicating proper exposure when the distance between the camera and subject is beyond the range of operation of the primary integral circuit means and proper exposure can still occur.

2. An auto-electronic flash unit according to claim 1 in which said primary and secondary integral circuit means are comprised of a comparing circuit and a switching circuit.

3. The auto-electric flash unit according to claim 2 wherein said photosensing means comprises a charging capacitor in series with a photosensing device.

4. The auto-electronic flash unit according to claim 3 in which said comparing circuit and switching circuit are connected in parallel with said charging capacitor, and said adjusting means comprises a potentiometer for adjusting the switching level of said switching circuit.

* * * * *